(12) United States Patent
Feith

(10) Patent No.: US 7,438,083 B2
(45) Date of Patent: Oct. 21, 2008

(54) PRESSURE REGULATOR FILTER ASSEMBLY

(75) Inventor: Raymond P. Feith, Chino Hills, CA (US)

(73) Assignee: Rain Bird Corporation, Azusa, CA (US)

( * ) Notice: Subject to any disclaimer, the term of this patent is extended or adjusted under 35 U.S.C. 154(b) by 246 days.

(21) Appl. No.: 11/197,469

(22) Filed: Aug. 4, 2005

(65) Prior Publication Data

US 2007/0028966 A1 Feb. 8, 2007

Related U.S. Application Data

(63) Continuation-in-part of application No. 11/195,178, filed on Aug. 2, 2005, now abandoned.

(51) Int. Cl.
*G05D 16/10* (2006.01)
(52) U.S. Cl. ............... 137/315.04; 137/315.11; 137/454.2; 137/505.25; 137/549
(58) Field of Classification Search ............. 137/236.1, 137/505.25, 549, 454.2, 505, 315.04, 315.11; 47/79; 405/39 X
See application file for complete search history.

(56) References Cited

U.S. PATENT DOCUMENTS

| | | | | |
|---|---|---|---|---|
| 2,519,805 | A * | 8/1950 | Wilkins | 137/505 |
| 3,623,776 | A * | 11/1971 | Wellman | 137/505.25 |
| 3,748,837 | A * | 7/1973 | Billeter | 137/549 |
| 3,945,686 | A * | 3/1976 | Orzel | 137/505.25 |
| 3,948,285 | A | 4/1976 | Flynn | |
| 3,978,880 | A * | 9/1976 | Crown et al. | 137/505.42 |
| 4,361,280 | A * | 11/1982 | Rosenberg | 137/236.1 |
| 4,898,205 | A * | 2/1990 | Ross | 137/505.12 |
| 4,913,352 | A | 4/1990 | Witty et al. | |
| 5,137,556 | A * | 8/1992 | Koulogeorgas | 137/549 |
| 5,230,366 | A * | 7/1993 | Marandi | 137/549 |
| 5,257,646 | A * | 11/1993 | Meyer | 137/505.25 |
| 5,456,285 | A * | 10/1995 | Lee | 137/549 |
| 5,509,407 | A * | 4/1996 | Schuler | 128/205.24 |
| 5,779,148 | A | 7/1998 | Saarem et al. | |
| 5,881,757 | A * | 3/1999 | Kuster et al. | 137/454.2 |
| 5,938,372 | A * | 8/1999 | Lichfield | 405/39 |
| 6,558,078 | B2 * | 5/2003 | Sowry et al. | 405/39 |

OTHER PUBLICATIONS

Photograph of Y-pipe filter assembly, retrieved Jan. 13, 2006 from the Internet at http://www.rainbird.com/images/products/drip/control/wyefilter_bg.jpg, illustrating a commercially available embodiment prior to Aug. 2, 2004, 1 page.

* cited by examiner

*Primary Examiner*—Stephen M Hepperle
(74) *Attorney, Agent, or Firm*—Fitch, Even, Tabin & Flannery

(57) ABSTRACT

A pressure regulating apparatus is disclosed for use in an irrigation network. A pressure regulator may be combined with a filter unit in a single pipe to reduce components and joints in the irrigation network. A pipe may be provided having openings in its sides for receiving and securing a portion of the pressure regulator. The openings may be reference ports for a pressure sink, and the ports may include a porous filter material for preventing ingress of particulate matter while permitting gas to pass therethrough. The pressure regulator has a reciprocating valve member which may be sealed within a housing of the pressure regulator or with an inner surface of the pipe. The incoming water is first filtered and then it goes to the pressure regulator. The pressure regulator may be assembled as sequentially installed components.

11 Claims, 10 Drawing Sheets

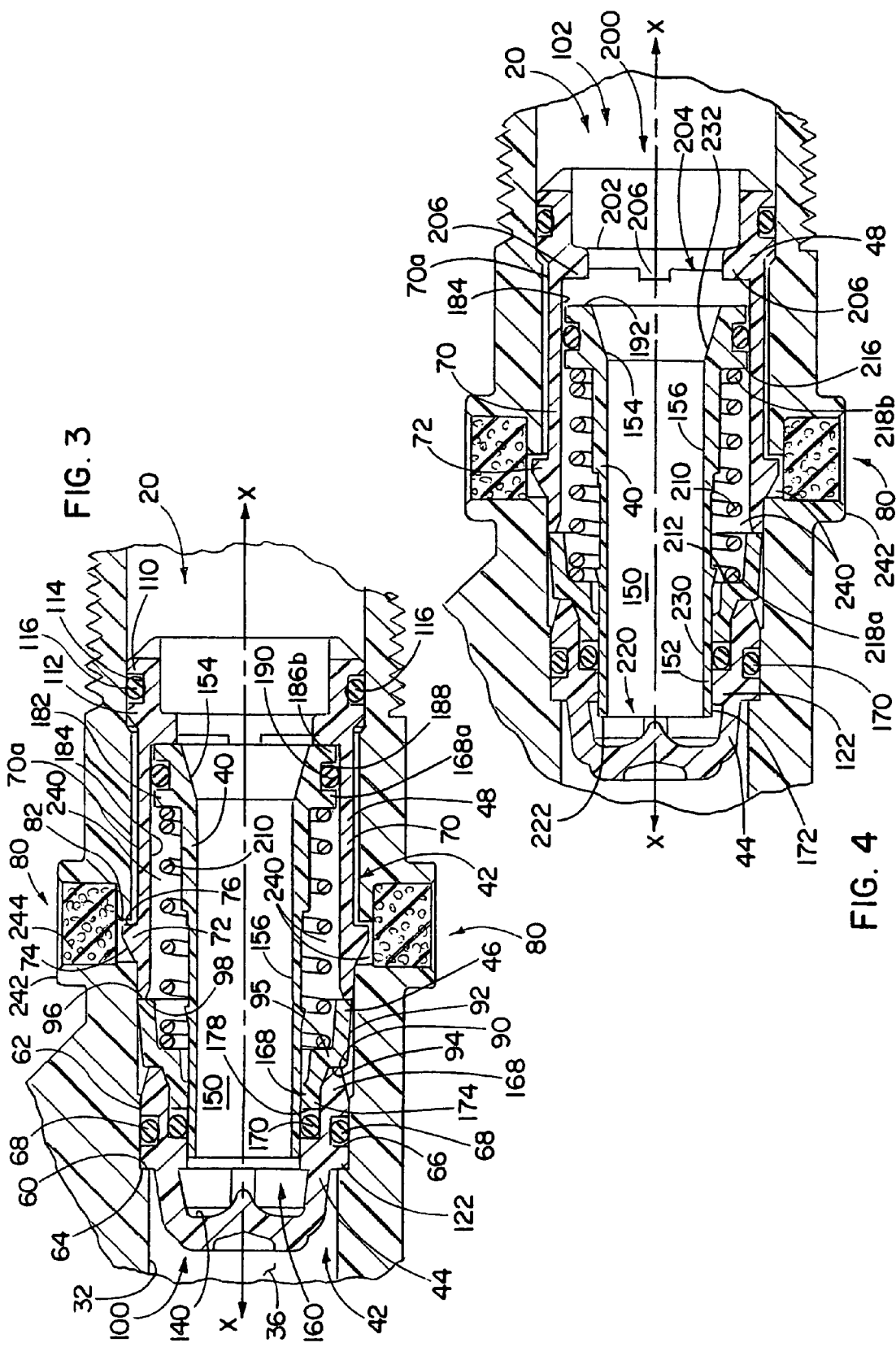

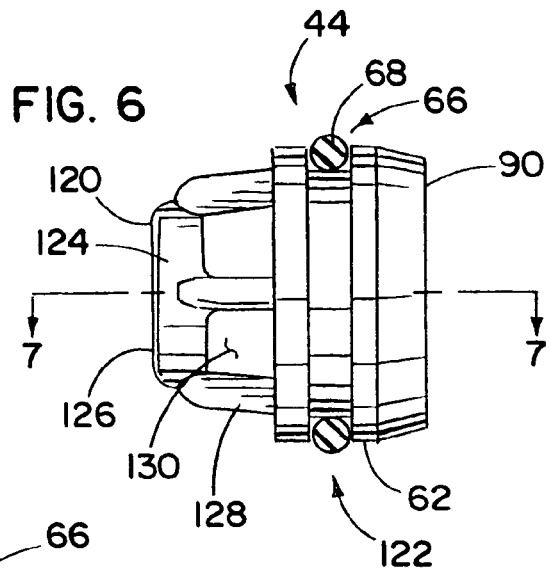
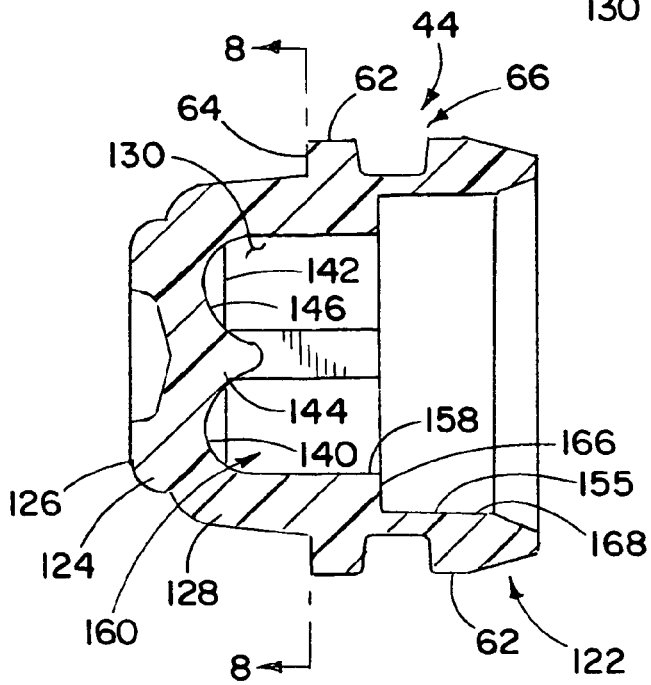
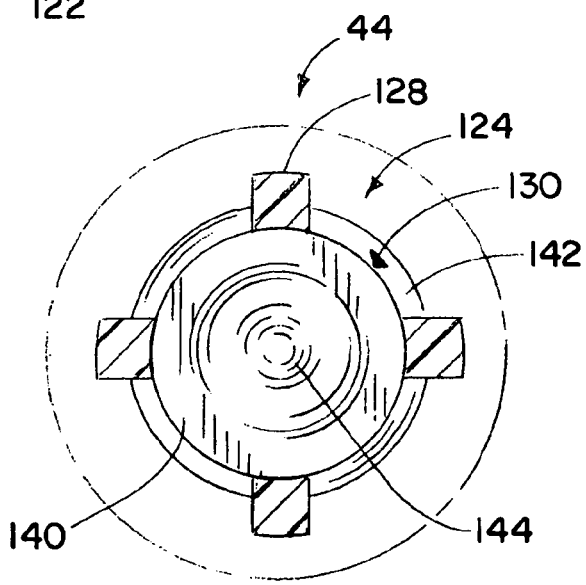

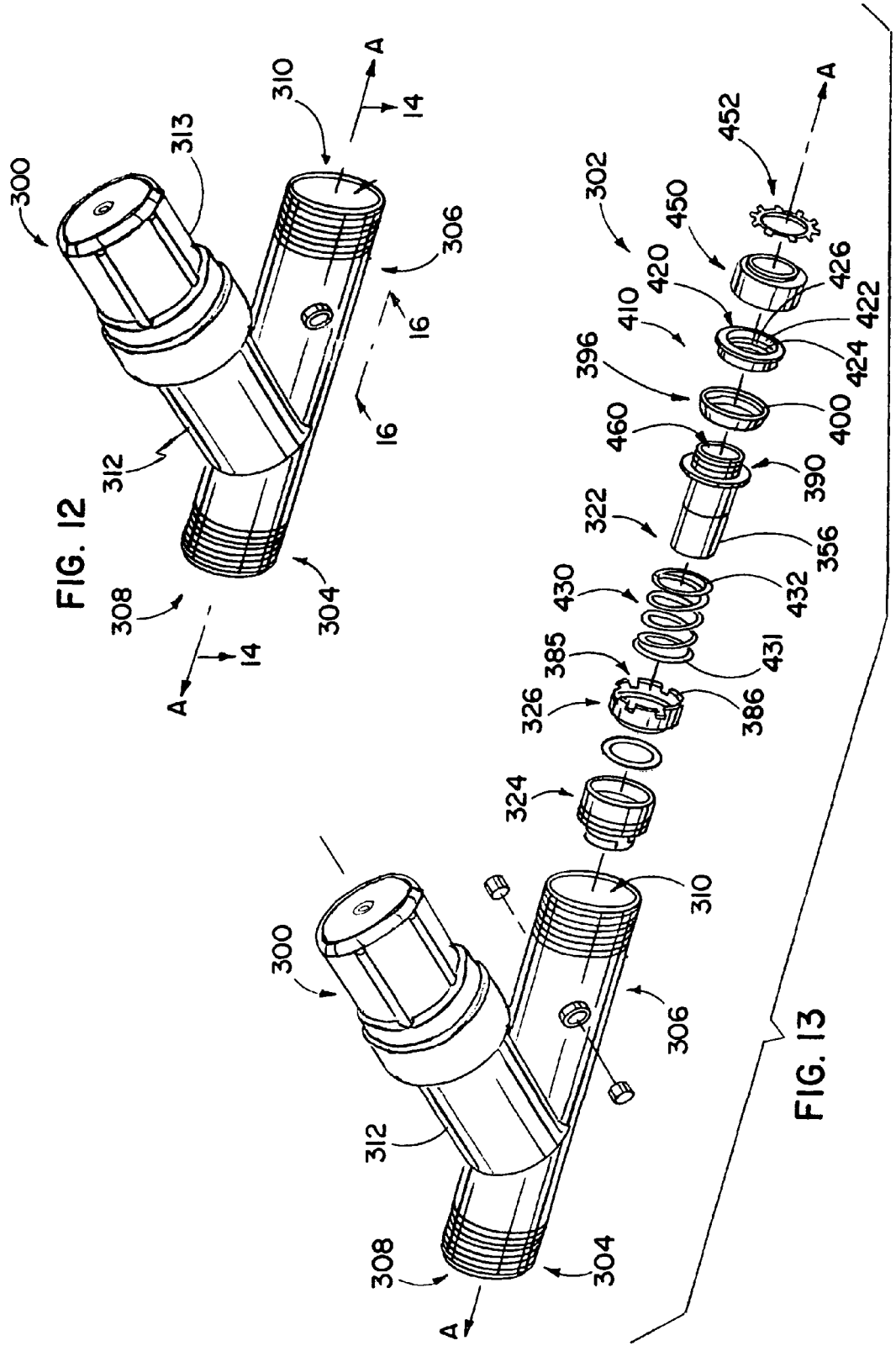

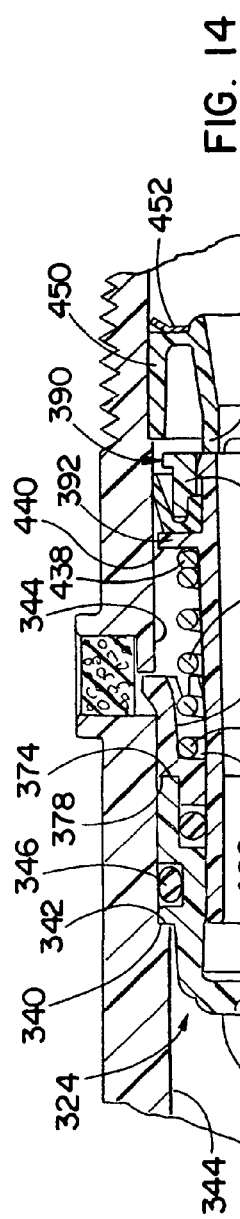
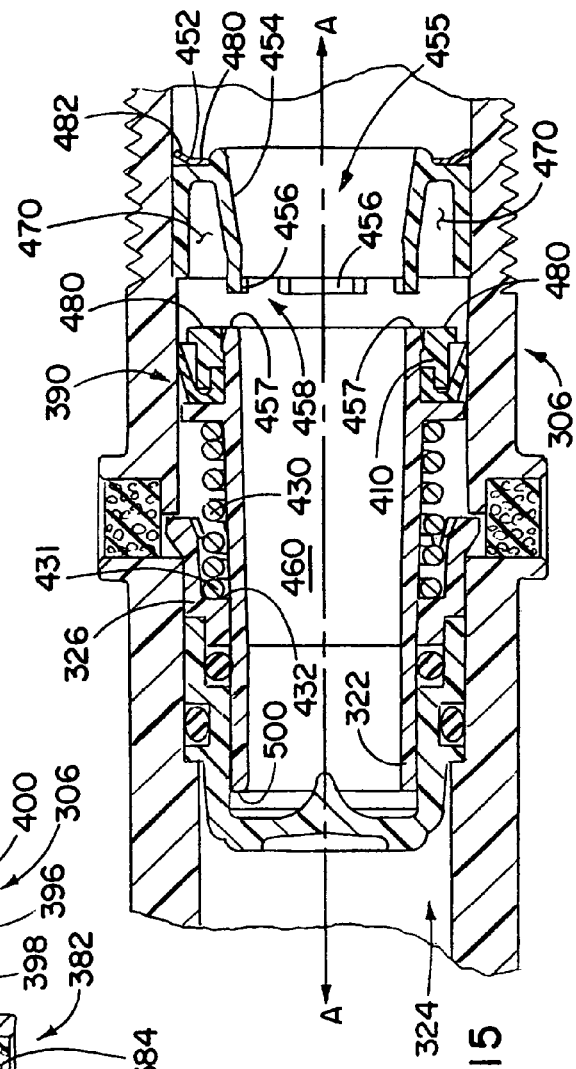
FIG. 14
FIG. 15

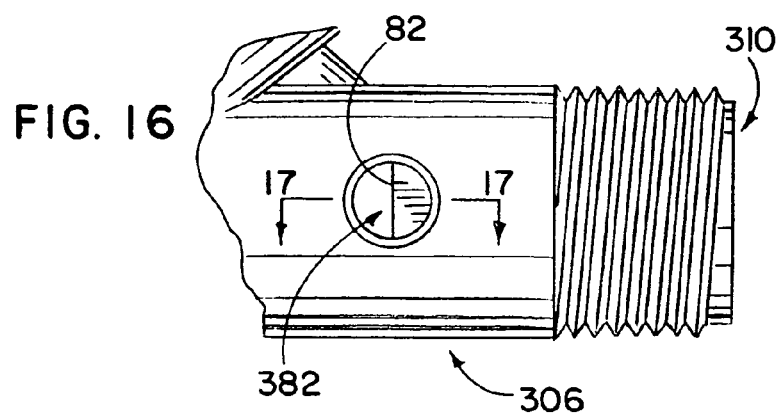
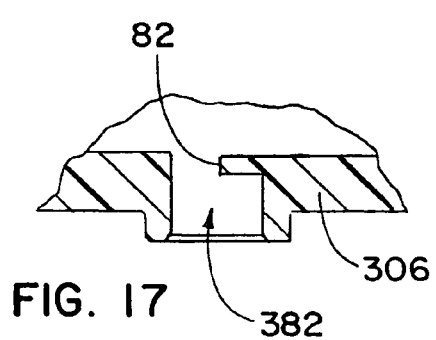
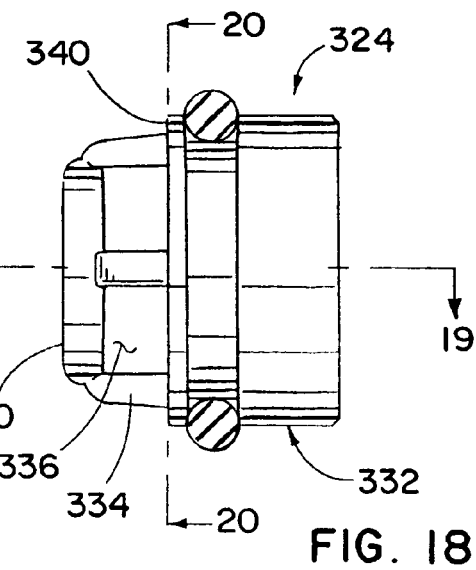
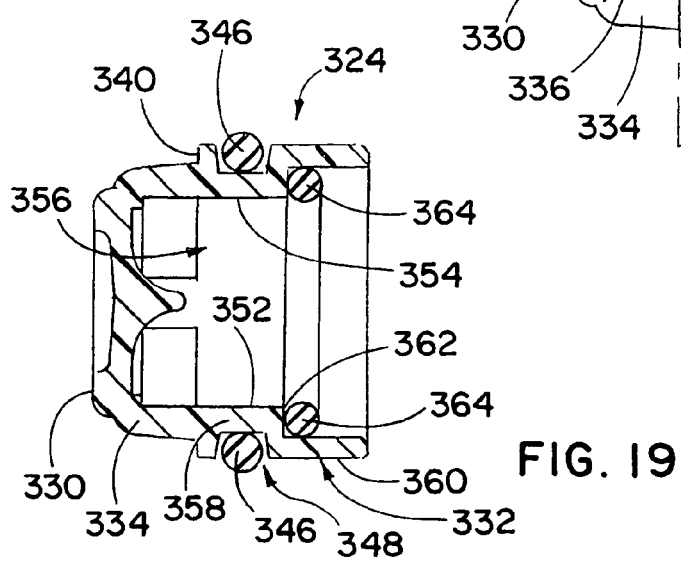

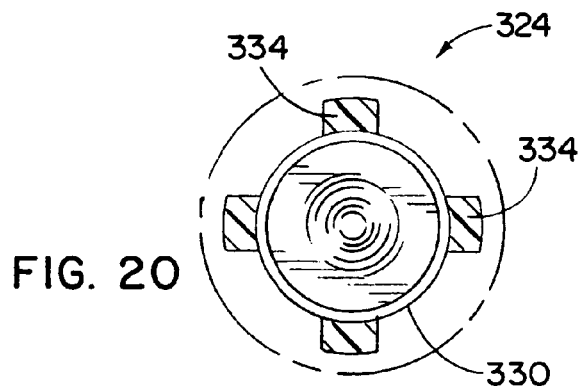
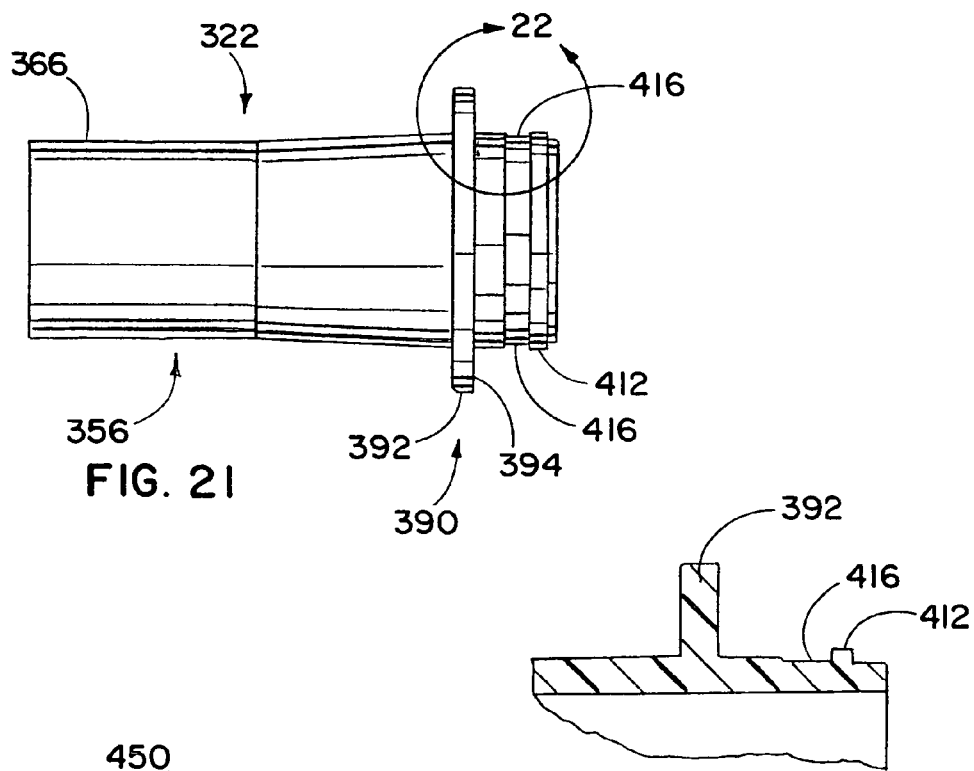
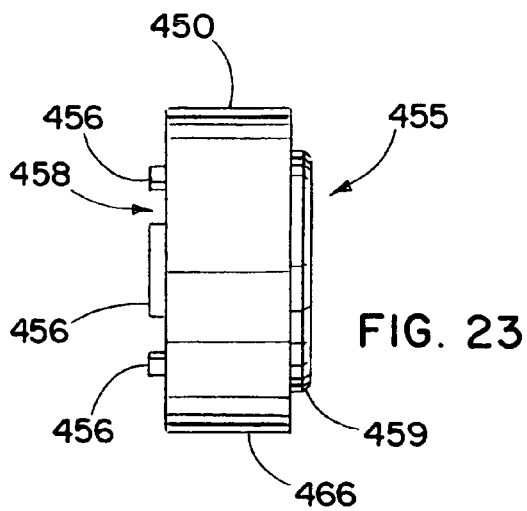

PRESSURE REGULATOR FILTER ASSEMBLY

CROSS-REFERENCE TO RELATED APPLICATION(S)

This application is a continuation-in-part of U.S. patent application Ser. No. 11/195,178, filed Aug. 2, 2005 now abandoned, entitled "Pressure Regulator Filter Assembly," the entirety of which is hereby incorporated herein by reference.

FIELD OF THE INVENTION

The invention relates to a pressure regulator and, in particular, to a pressure regulator located in a conduit of fluid delivery network.

BACKGROUND

In a typical irrigation network, water is delivered from a water source to various arterial pipes or branches. The water source delivers the water under pressure to the network. The network includes a number of water emission points, each having a water emission device, such as a drip emitter or sprinkler. The sprinkler type may range from a small, fan-spray nozzle to a large scale rotary nozzle.

A number of factors lead to the use of various sized pipes being used in the irrigation network. The piping components of the network are sized to deliver the desired capacity of water to the watering area. The main delivery pipe is the largest pipe of the network. The water delivered by the main pipe is then divided amongst one or more arterial pipes from which a number of smaller pipes, such as stems, branch off of to deliver water to each of the individual sprinkler heads. If all the pipes of the network were sized similarly, such as to that of the main pipe, the water flow reaching the sprinkler heads would be reduced to such a low pressure, so as not to produce the desired water pattern from the sprinkler head. To address this, it is common for the pipe size to decrease as the pipes branch away from the main pipe.

In a large irrigation network, for instance, every sprinkler is not necessarily in operation at the same time. As an example, a golf course has many different areas that have different irrigation needs. Similarly, a homeowner's yard may have a southern exposure side that receives more sunlight and, thus, requires a greater amount of irrigation than a shaded area. For this reason, the sprinklers may be selectively utilized or activated from area to area throughout the golf course or yard.

At the input, the flow and pressure are designed so that the entire network may be operating at the same time. That is, the irrigation network is designed so that all of the sprinklers may be operating simultaneously. When only a portion of the sprinklers are operating, there is a pressure surplus which can frustrate the desired watering of the system. In addition, a pressure surge or spike at any time during the operation of the irrigation system may cause malfunction of one or more components of the irrigation systems.

One manner of addressing pressure changes is to provide pressure regulators. Often a pressure regulator is positioned within either the stem or in a housing of the sprinkler itself. The pressure regulator may be calibrated for the particular sprinkler, such as through the use of a spring having a specified spring constant, so water is permitted through the sprinkler within a desired range of pressure and flow rate.

As is well-known, pressure or head loss is experienced along the length of any pipe, and throughout the irrigation network. Head loss is also experienced at any point within a piping system where fluid is required to change its flow profile, such as around a corner or elbow, through a filter or filtration device, through a valve, or through a non-uniformity in the pipe size or inner surface. For this reason, a common belief is that the pressure regulator should be located immediately upstream of or within the sprinkler. In other words, the closer the pressure regulator is to the point of emission, the more accurately the pressure can be controlled by the pressure regulator so that the pressure remains in the desired range.

However, positioning of a pressure regulator in the sprinkler itself, or in the stem, is often not appropriate. First, it would require a dedicated pressure regulator for each sprinkler or emission device and calibration of the pressure regulator for that sprinkler or device. Moreover, many sprinkler heads are not traditionally equipped with a pressure regulator due to size restrictions, such as a stem and housing with a relatively small diameter, or with a relatively short length. For a low-flow emitter, such as a bubbler, it is difficult to properly calibrate a pressure regulator for each emitter.

Because of these shortcomings, the pressure regulator may be located upstream of the emission device, such as in a conduit or pipe section of the network. In this manner, the pressure regulator is utilized to control the flow through a number of sprinkler heads and a number of branches of the irrigation network. For a group of low-flow bubblers, it is most effective to control the flow through the group as an entirety. As such, inclusion in the irrigation network contributes additional joints, leading to head loss. Furthermore, although the conduit is typically straight, a configuration which minimizes un-intended head loss therethrough, it adds length to the overall piping.

A typical irrigation network includes control boxes or kits in which a number of control components are located, including, for example, an in-line pressure regulator conduit and a filter unit. The size and number of boxes, which commonly are buried in the ground, are selected depending on the system requirements.

Current pressure regulators utilize a vent to the atmosphere. More specifically, these pressure regulators utilize a valve member which shifts against the bias of a spring in the face of a force difference on opposite portions of the valve member. This requires a pressure sink, such as the atmosphere, to be located on one side of the valve member while the other side is exposed to the pressure of the water flow. One example of such a prior art pressure regulator is disclosed in U.S. Pat. No. 5,779,148, to Saarem, et al. ("the '148 patent"). In the '148 patent, the pressure regulator includes a vent communicating both with an otherwise sealed cavity surrounding a shifting member and with the atmosphere by passing between a housing and a seal.

Alternatively, when the pressure regulator is located in a control box, the pressure vent communicates with the interior of the box itself. In other forms, the pressure regulator may simply rely on a seal, such as that disclosed in the '148 patent that permits communication therethrough but is less than perfect in preventing ingress of dirt or particulate matter.

Assembling and securing currently known pressure regulators also presents a number of issues. By way of example, the '148 patent utilizes a shoulder within the housing to restrict the upward motion of the pressure regulator. During downward motion of the shifting member, the apparent means of preventing shifting of the pressure regulator as a whole within the housing is the pressure experienced from the water flow itself. It is noted that the 'shoulder' is not at a right angle, instead being more of a ramped surface, such that pressure on the pressure regulator forces the housing to expand, forces the regulator to move upward, and creates stress concentrations on the housing. Expansion of the housing itself reduces the efficacy of the seals between the pressure regulator and the interior of the housing, which may allow the vent to the atmosphere to receive water and/or pressure, such that the desired function of the pressure regulator is lost. This tends to result with the sprinkler providing water in an undesirable manner.

In other pressure regulators, a different means of retention may be provided. The regulators are typically installed from the bottom of the sprinkler housing or a riser therein. The pressure regulator has an inlet positioned to face the incoming water flow into the sprinkler, typically at a bottom end, and an outlet positioned in the direction of the outgoing water flow. The retention device or structure is used to prevent downward expulsion or shifting of the pressure regulator from the housing, which may occur due to a negative pressure that sometimes occurs when a portion or entirety of a network is shut off. The retention device is inserted into the housing at a bottom portion of the pressure regulator.

Accordingly, there has been a need for an improved device for regulating pressure throughout portions of a fluid delivery network, such as an irrigation system.

BRIEF DESCRIPTION OF THE DRAWINGS

FIG. 3 is a partial cross-sectional view of the pipe assembly taken through line 3-3 of FIG. 1 showing the pressure regulator in a fully opened configuration;

FIG. 4 is a partial cross-sectional view corresponding to FIG. 3 showing the pressure regulator in a partially opened configuration with the movable member positioned a distance from the stops of the housing body;

FIG. 6 is a side elevation view of an inlet cage of the pressure regulator of FIG. 2;

FIG. 7 is a cross-sectional view of the inlet cage taken through line 7-7 of FIG. 6;

FIG. 8 is a cross-sectional view of the inlet cage taken through line 8-8 of FIG. 7;

FIG. 12 is a perspective view of an alternate pipe assembly of an irrigation network having a filter assembly and a pressure regulator;

FIG. 13 is a partially exploded perspective view of the pipe assembly of FIG. 12;

FIG. 14 is a cross-sectional view of the pipe taken through the line 14-14 of FIG. 12 showing the pressure regulator in a fully opened configuration;

FIG. 15 is a cross-sectional view corresponding to FIG. 14 showing the pressure regulator in a partially opened configuration;

FIG. 16 is a fragmentary view of the pipe assembly taken through line 16-16 of FIG. 12;

FIG. 17 is a fragmentary cross-section view taken through line 17-17 of FIG. 16;

FIG. 18 is a side elevation view of an inlet cage of the pressure regulator of FIG. 13;

FIG. 19 is a cross-sectional view of the inlet cage taken through line 19-19 of FIG. 18;

FIG. 20 is a cross-sectional view of the inlet cage taken through line 20-20 of FIG. 18;

FIG. 21 is a side elevational view of the movable member of the pressure regulator of FIG. 13;

FIG. 22 is a fragmentary view in cross-section of the detail area 22 of FIG. 21;

FIG. 23 is a side elevational view of the stationary member retainer of the pressure regulator of FIG. 13;

DETAILED DESCRIPTION OF THE PREFERRED EMBODIMENT(S)

Referring initially to FIGS. 1-4, there is illustrated an irrigation pipe assembly 10 with a filtration system 13 and a pressure regulator 20. In contrast to prior art systems utilizing a separate pipe for each of a filter and a pressure regulator, the pipe 10 incorporates both. This integration reduces the size and number of control boxes used for these components and the connections necessary between the components and provides a compact assembly for an in-line portion of the irrigation network. It also eliminates the need for a pressure regulator located in each sprinkler head or the stem therefor.

Figures 1, 2:
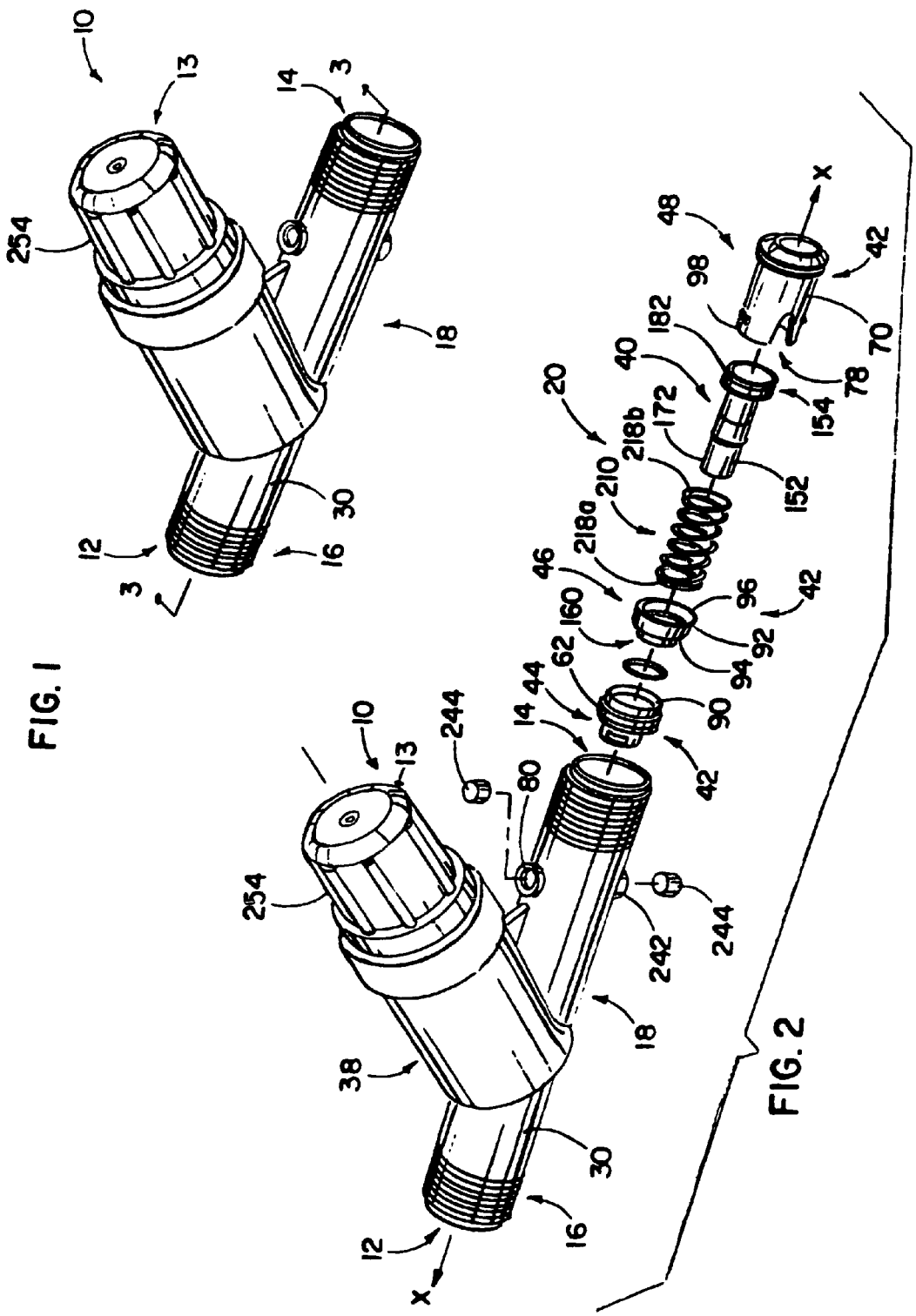
FIG. 1 is a perspective view of a pipe assembly of an irrigation network having a filter assembly and a pressure regulator.
FIG. 2 is a partially exploded perspective view of the pipe assembly of FIG. 1.

With particular reference to FIGS. 1 and 2, the irrigation pipe 10 has an inlet 12 for receiving water a water source (not shown), such as a water main or a well. The irrigation pipe 10 also has an outlet 14 for delivering water to one or more sprinkler heads or other emission devices (not shown). In this manner, a single pressure regulator 20 may regulate the flow of water to one or more sprinklers.

In addition, the pressure regulator 20 is capable of regulating flow of water to a sprinkler that, due to size considerations of the sprinkler or its stem, is not capable of supporting a dedicated pressure regulator. Some sprinkler types, such as pop-up sprinklers having a spinning deflector sprinkler head, have a movable housing with an inner diameter of an inch or less. Within that inner diameter a number of components may be located, which together require a relatively small amount of space. Therefore, inclusion of a pressure regulator is difficult and most times impossible. In addition, other types of sprinklers are secured to a relatively short vertical stem or housing. Increasing the length of the stem or housing to accommodate a pressure regulator is most times not desirable. As the stem or housing often times is connected to a source pipe of the irrigation network at its bottom-most point, the source pipe must also be buried deeper. Utilization of the pressure regulator 20 in the pipe 10 of the irrigation network itself does not require re-engineering of the sprinklers or emission devices and does not require additional piping or length added to the network or to the sprinklers themselves.

Furthermore, the pressure regulator 20 obviates the need for calibrating a pressure regulator for a specific sprinkler. For example, a plurality of arteries of the irrigation network may branch an equal distance from a central delivery pipe, each terminating in a sprinkler being utilized for an area having generally uniform watering requirements. A single range of pressure and flow rate is desired for each sprinkler, and the central delivery pipe may be the pipe 10 utilizing the pressure regulator 20 to provide the single range. As another example, a low-flow or drip system utilizes emission devices that operate at a low pressure, such as 25-60 PSI, while connected to a source delivering water at a relatively high pressure, such as 150 PSI. The pipe 10 and pressure regulator 20 may be utilized with these systems to provide the desirable pressure range (and pressure drop from the source) to a plurality of emission devices and need not be utilized at each sprinkler.

The pipe 10 and the pressure regulator 20 are depicted in FIGS. 1-4, with the pressure regulator 20 being depicted in fully open and partially open configurations in FIGS. 3 and 4, respectively. The pipe 10 includes an inlet section 16 including the inlet 12, and an outlet section 18 including the outlet 14. Each of the sections 16 and 18 includes external threads for coupling the pipe 10 to other pipes (not shown) of the irrigation network to communicate water from the water source to the emission devices. As the arterial branches of the irrigation system are principally straight, each of the sections 16 and 18 are generally co-aligned as to have a central axis X along a general direction of flow therein. The sections 16, 18 are cylindrical with a generally uniform outer diameter defined by an exterior surface 30. The sections 16, 18 also have an interior surface 32 defining interior passages 34 and 36 through the respective sections 16, 18 for the flow of water therethrough (see FIG. 5).

Figure 5:
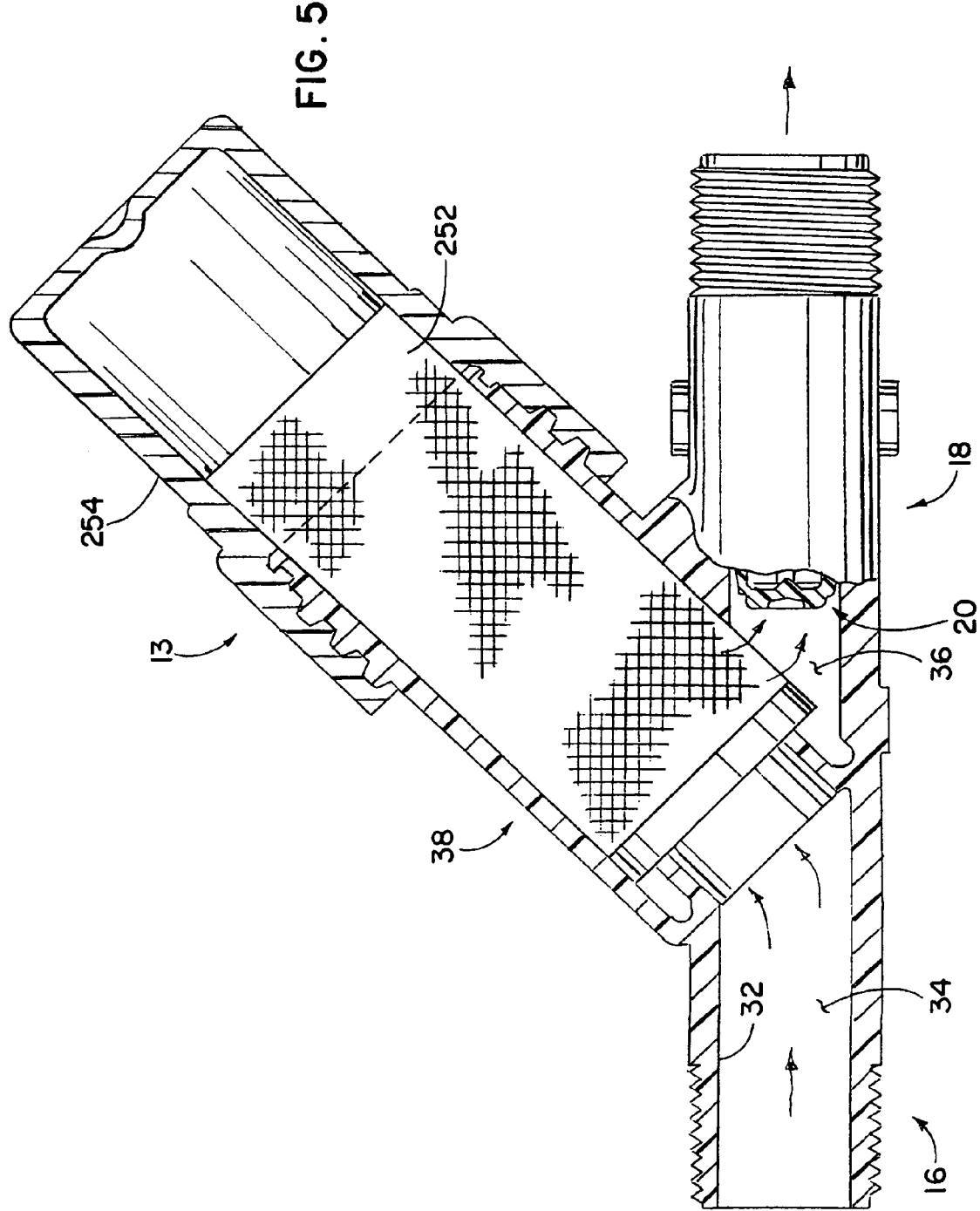
FIG. 5 is a partial cross-sectional view of the pipe assembly showing the filter assembly and a water flow path through the pipe.

In the preferred embodiments, the passages 34 and 36 do not communicate directly with each other. Instead, the fluid is bypassed through a side pipe 38, as can be seen in FIG. 5. In the present embodiments, the side pipe 38 includes a filtration unit 13 having a filter 252. Flow of water enters the inlet section 16 and passes into the side pipe 38. In order to flow through the pipe 10, the water must flow from the inlet section 16 into the side pipe 38, through the filter 252, and into the outlet section 18 with the pressure regulator 20.

The side pipe 38 forms an acute angle with the outlet section 18. The filtration unit 13 includes a cap 254 threadably connected to the side pipe 38. The cap 254 may easily be disconnected, beneficially allowing the filter 252 to be removed, inspected, or replaced, and doing so without requiring the pipe assembly 10 to be disconnected from the irrigation network. The side pipe also may include an automatic debris flushing system (not shown).

In addition to the benefits noted above, the coupling of the pressure regulator 20 and filter 252 together enhances the overall pressure control. For example, the path of water through the side pipe 38 creates a significant amount of head loss for the water pressure. The adjacent location of the pressure regulator 20 to the filter 252 in the single construction beneficially enables the pressure regulator 20 to provide the desired downstream pressure immediately subsequent to one of the most significant points of head loss in the irrigation network.

The pressure regulator 20 is disposed within the outlet section 18. The pressure regulator 20 includes a number of components which are preferably installed serially or sequentially in the outlet section 18, though in some forms the pressure regulator 20 may be installed as a unit.

As will be discussed below, the pressure regulator 20 includes a reciprocating member 40 which shifts with respect to a pressure regulator housing 42 (FIG. 2) when the water pressure exceeds a pre-determined level so that the flow of water is restricted by the pressure regulator 20. The housing 42 is secured within the pipe 10 and includes an inlet cage 44 (FIGS. 6-8) secured against the pipe 10, a housing body 48 (FIGS. 9-11) secured with the pipe, and a housing ring 46 positioned between the inlet cage 44 and the housing body 48, as can be seen in FIGS. 3 and 4.

As best viewed in FIG. 3, the pipe 10 and the inlet cage 44 cooperate to fix the position of one end of the pressure regulator 20. The outlet section 18 of the pipe 10 includes an annular shoulder 60 formed on its interior surface 32 at a right angle with the central axis X for positioning and abutting the inlet cage 44. In turn, the inlet cage 44 has an exterior surface 62 including a shoulder 64 (see FIGS. 6 and 7) such that, when the inlet cage 44 is installed through the outlet 14 and driven into the outlet section 18, the shoulders 64 and 60 become engaged. In contrast to prior art systems where a pressure regulator is installed through an inlet, the problems experienced by sprinklers expelling the pressure regulator 20 in the direction of incoming water flow are eliminated.

Figure 9:
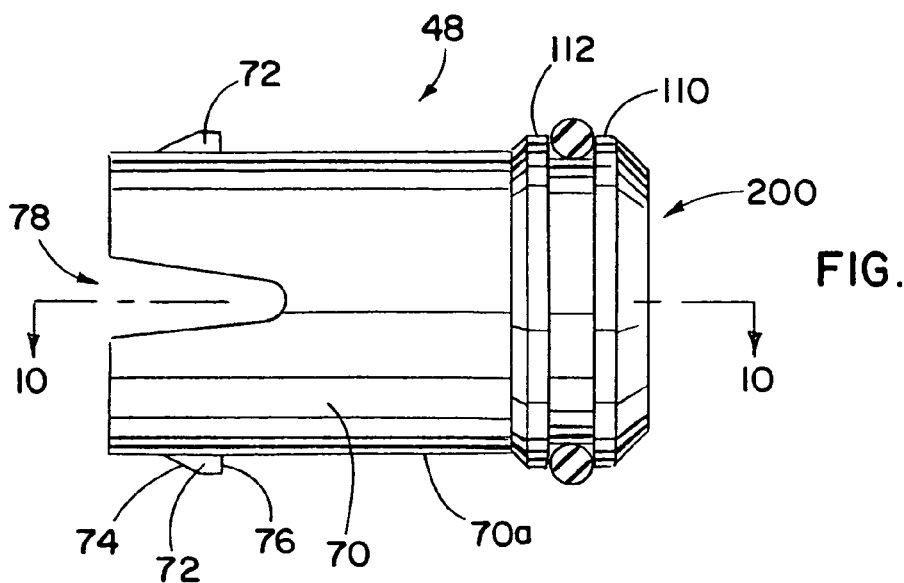
FIG. 9 is a side elevation view of the housing body of the pressure regulator of FIG. 2.

The pipe 10 also cooperates with the housing body 48 to fix the position of the other end of the pressure regulator 20 within the pipe 10. The housing body 48 has a generally cylindrical shell portion 70 with an exterior surface 70a having a pair of exterior barbs 72 positioned outwardly and diametrically opposed. As can be seen in FIG. 9, the barbs 72 include a leading chamfer or ramped surface 74 and a terminal wall 76 generally orthogonal to the exterior surface 70a. The cylindrical shell portion 70 further includes a pair of cut-outs 78 diametrically opposed and offset generally 90 degrees from the barbs 72.

The pipe 10 defines a pair of vent ports 80 (FIG. 2) that receive and interlock with the barbs 72. Each port includes a straight wall surface 82 generally orthogonal to the central axis X. As the housing body 48 is inserted through the outlet 14, the interior surface 32 of the pipe 10 contacts the ramp surfaces 74 to force the barbs 72 to compress inwardly and enable them to slide against the interior surface 32. The cut-outs 78 (FIG. 9) permit the portions of the shell 70 on which the barbs 72 are located to more easily flex inwardly for insertion. Once the housing body 48 is inserted to a predetermined depth within the outlet section 18, the barbs 72 align with the vent ports 80 and, the housing body 48 being resiliently deformable, the barbs 72 shift outwardly and into the vent ports 80. Once the barbs 72 are received in the vent ports 80, the barb terminal wall 76 abuts the wall surface 82 within the port 80 to prevent unintentional removal of the housing body 48. In order to remove the housing body 48, the barbs 72 must be deflected inwardly through their respective port 80. Accordingly, the contact between the terminal wall 76 and the wall surface 82 prevents the housing body 48 from being expelled from the pipe 10 downstream in the direction of water flow.

The depth to which the housing body 48 is received is determined by both the inlet cage 44 and the housing ring 46. More precisely, the inlet cage 44 is inserted until the shoulders 60 and 64 are in contact (FIG. 3). The inlet cage exterior surface 62 further has a shoulder surface 90 (FIG. 6) oriented in the downstream direction. The housing ring 46 has an exterior surface 92 including a shoulder 94, and the housing ring 46 is installed so that its shoulder 94 contacts the inlet cage shoulder 90 (FIG. 3).

The housing body 48 is inserted until it contacts the housing ring 46. Specifically, the housing ring 46 has a downstream end 96, while the housing body 48 has an upstream end 98. The housing body 48 may be inserted until its upstream end 98 contacts the downstream end 96 of the housing ring 46 (see FIG. 3). Therefore, the housing ring 46 permits the housing body 48 to be inserted until each is in contact with the other, and the housing ring 46 prevents the housing ring 46 from being inserted to a depth only slightly greater than that necessary to permit the barbs 72 to be received in and interlock with the vent ports 80.

The pressure regulator housing 42 has an inlet end, or PR inlet 100, positioned towards and in the path of water entering the outlet section 18, and an outlet end, or PR outlet 102, for delivering water upstream to portions of the network through the pipe outlet 14, as can be seen in FIG. 3. Both ends 100, 102 are sealed with the pipe interior surface 32.

At the PR inlet 100, the inlet cage exterior surface 62 includes an annular groove 66 located a short distance from the inlet cage shoulder 64 (FIG. 6). Within the groove 66 a seal 68, such as an O-ring, is located for sealing the inlet cage 44 with the interior surface 32 of the pipe 10. The seal 68 generally prevents pressure or water bleed between the inlet cage 44 and the pipe 10.

Figure 10:
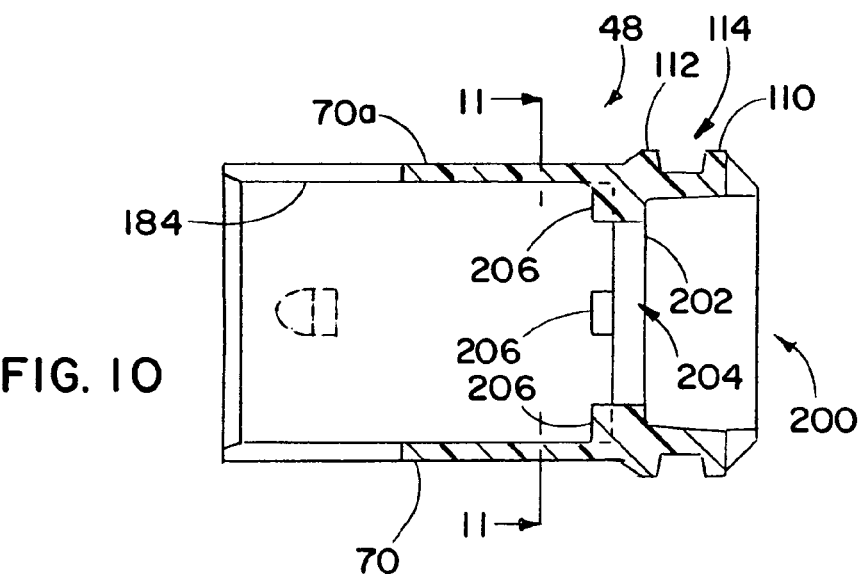
FIG. 10 is a cross-sectional view of the housing body taken through line 10-10 of FIG. 9.
Figure 11:
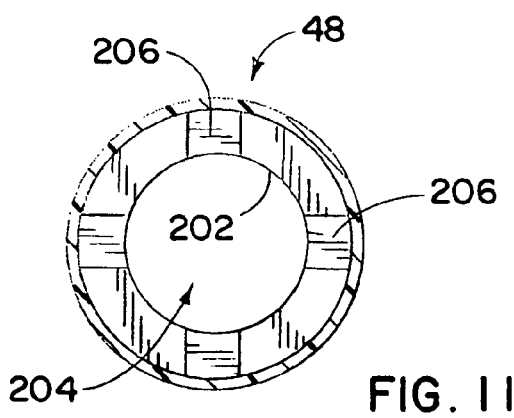
FIG. 11 is a cross-sectional view of the housing body taken through line 11-11 of FIG. 10.
Figure 24:
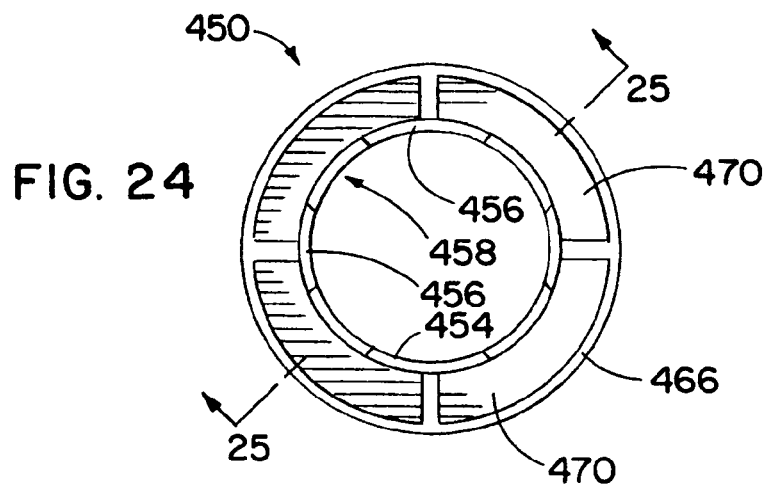
FIG. 24 is a rear side elevational view of the stationary member retainer.
Figure 25:
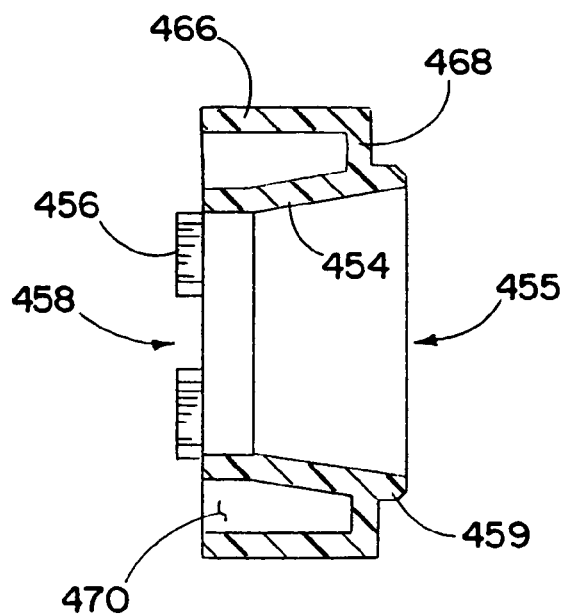
FIG. 25 is a cross-sectional view of the stationary member retainer taken through the line 25-25 of FIG. 24.
Figure 26:
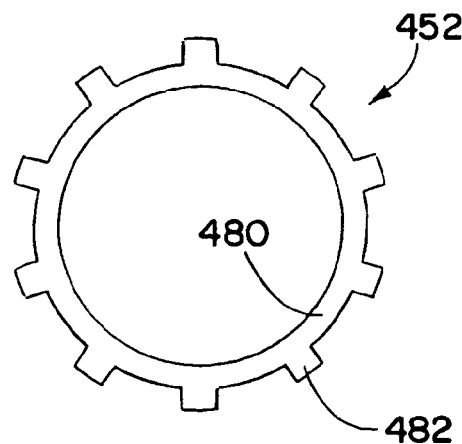
FIG. 26 is a side elevational view of a retainer ring of the pressure regulator of FIG. 13.

At the PR outlet 102, the housing body 48 includes first and second annular rings 110 and 112 defining a gap 114 therebetween, as can be seen in FIGS. 3, 9, and 10. A seal 116, such as an O-ring, is located in the gap 114 for sealing the pipe interior surface 32 with the housing body 48 to prevent pressure or water bleed therebetween.

With reference to FIGS. 3 and 6-8, the PR inlet 100 is defined by the inlet cage 44 which promotes even distribution of fluid flow into the pressure regulator 20. Toward this end, the inlet cage 44 has a distribution plate 120 positioned initially in the path of incoming water and a body ring 122 positioned a short distance from the distribution plate 120, the above-described exterior surface 62 of the inlet cage 44 being formed on the body ring 122.

As can be seen in FIGS. 6-8, the distribution plate 120 has a central portion 124, generally solid and impervious to water. The central portion 124 has a first side 126 facing in the direction of incoming water, the first side 126 having a concave, convex, or generally flat contour. The distribution plate 120 is connected to the body ring 122 by a plurality of ribs 128. In the present embodiment, there are four ribs 128 positioned every 90 degrees around the distribution plate 120 to provide sufficient rigidity to the connection, though the number and configuration may be altered.

As water flows to the pressure regulator 20, the central portion 124 forces the water to flow therearound, and the ribs 128 further serve to break-up the water flow. Accordingly, the distribution plate 120 and ribs 128 promote even or balanced flow of the water into the body ring 122 by forcing the water to flow around the plate 120 and through inlets 130 defined between the ribs 128.

The reciprocating member 40 and the inlet cage 44 cooperate to regulate the amount of fluid flow through the pressure regulator 20. When the pressure regulator 20 is fully opened, as depicted in FIG. 3, the reciprocating member 40 is positioned away from the inlet cage 44. When the reciprocating member 40 is shifted towards the inlet cage 44, the reciprocating member 40 restricts the flow of fluid through the inlets 130, as can be seen in FIG. 4.

More specifically, the reciprocating member 40 shifts relative to a second side 140 of the central portion 124 to control fluid flow through the inlets 130, best seen in FIGS. 3, 4, and 6. The second side 140 generally faces the reciprocating member 40 and has a peripheral annular wall 142 extending a short distance therefrom, the ribs 128 extending between the body ring 122 and the wall 142. The second side 140 preferably has a centrally positioned cone or conical structure 144 having a sloped and curved surface 146. As water flows through the inlets 130, the conical structure 144 directs the fluid towards the reciprocating member 40 and reduces turbulence from the flow around the distribution plate 120.

The reciprocating member 40 is generally tubular to define a fluid passage 150 therethrough for water to flow through the pressure regulator 20, depicted in FIGS. 3 and 4. More specifically, the reciprocating member 40 includes a cylindrical body portion 152 and an exit portion 154 (see FIG. 4), together the portions 152 and 154 having an interior surface 156 defining the fluid passage 150. The fluid passage 150 extends along and is positioned co-axially with the central axis X.

The reciprocating member 40 is received within the pressure regulator housing 42, and the body portion 152 is slidably received within the inlet cage body ring 122. As best seen in FIG. 7, the body ring 122 has an interior surface 155, a first section 158 of which defines an aperture 160 surrounded by the shoulder surface 64. The aperture 160 is sized to be smaller than the distribution plate central portion 124, and an exterior surface 172 (FIG. 4) of the reciprocating member body portion 152 is closely fit within the aperture 160 to minimize the flow of water therebetween.

Additionally, the reciprocating member body portion 152 is sealed with the body ring 122. As can be seen in FIG. 7, the body ring interior surface 155 has a shoulder 166 formed between the first section 158 and a second section 168. The second section 168 has a greater diameter than the first section 158, and a seal 170 (FIG. 4) such as an O-ring is positioned against the shoulder 166 and second section 168. The seal 170 further contacts the exterior surface 172 of the reciprocating member body portion 152 to minimize pressure or fluid bleed between the reciprocating member 40 and the inlet cage 44 (FIG. 4).

The housing ring 46 assists in retaining the seal 170 in position. As best viewed in FIG. 3, the above-described shoulder portion 94 of the exterior surface 92 is formed on an annular ring 95 extending radially inwardly. A cylindrical section 174 extends from the shoulder 94 and is received within the second section 168 of the body ring 122. The cylindrical section 174 includes a terminal end surface 178 formed thereon which contacts and restricts movement of the seal 170.

With reference to FIG. 3, the reciprocating member 40 also is sealed with the housing body 48. The exit portion 154 of reciprocating member 40 has an exterior surface 182 configured to seal with an inner surface 184 of the housing body 48. The exterior surface 182 includes first and second annular portions 186a, 186b defining an annular groove 188 therebetween. An annular seal 190 is disposed between the annular portions 186 in contact with the housing body inner surface 184. As the reciprocating member 40 is shifted with respect to the housing 42, the seal 190 shifts along with the reciprocating member groove 188.

The housing body 48 defines the position of the reciprocating member 40 when the pressure regulator 20 is fully open, as can be seen in FIG. 4. The reciprocating member 40 includes a terminal end wall 192 facing downstream. The housing body 48 includes an exit portion 200 through which fluid flows once it has exited the reciprocating member passage 150. The exit portion 200 includes a wall 202 radially extending inward to define an exit orifice 204. The wall 202 includes short stops 206 oriented towards the reciprocating member terminal end wall 192 such that the reciprocating member terminal wall 192 is generally spaced from the wall 202 and exposed to the water flowing through the pressure regulator 20.

The reciprocating member 40 is biased towards the fully open position (FIG. 3) so that, under normal operating pressures, its terminal wall 192 contacts the housing body stops 206 (see FIG. 4). This bias is provided by a PR spring 210 having a spring constant selected for expected or desired operating pressure. For example, normal operating pressure may generally range between 20 psi and 40 psi, and the spring constant may be approximately 9.0 lb. force/inch.

With reference to FIG. 4, the PR spring 210 is positioned between the reciprocating member 40 and the pressure regulator housing 42. The housing ring 46 has the above-noted annular ring 95 extending inwardly to form the shoulder 94 on the exterior surface 92. Similarly, the annular ring 95 forms a shoulder 212 formed on its interior surface 214 and facing in the downstream direction. The reciprocating member exterior surface 172 includes a shoulder 216 formed on the first annular portion 186a extending radially outwardly. The PR spring 210 is positioned so that first and second ends 218a, 218b respectively contact the housing ring shoulder 212 and the reciprocating member shoulder 216, respectively.

The reciprocating member 40 is biased towards the fully open position and rests against the housing body stops 206 when the fluid pressure is below a predetermined level. The reciprocating member 40 compresses the PR spring 210 so that the reciprocating member 40 shifts away from the housing body stops 206 and towards the side 140 (FIGS. 3 and 7) of the distribution plate 120 of the inlet cage 44 to restrict the flow of water through the inlets 130. In order for the reciprocating member 40 to shift, pressure from fluid flow through the pressure regulator 20 exceeds the predetermined level.

More precisely, the reciprocating member 40 shifts when fluid pressure through the reciprocating member passage 150 exceeds a predetermined level to create a force differential on the reciprocating member 40 sufficient to overcome the bias of the PR spring 210. As is known, pressure is force per area. Accordingly, force applied to an area is equal to the pressure times the area. Thus, the force difference is created by applying an equal pressure to different sized areas on the reciprocating member.

One of these areas is formed on the reciprocating member body portion 152. The body portion 152 is, as noted above, generally cylindrical and has an inlet 220 such that there is a terminal annular face 222 formed at the inlet 220 and directed into the flow of incoming water (FIG. 4). The body portion 152 has a relatively small wall thickness such that the pressure exerted on the face 222 does not create a significant force because the area of the terminal annular face is relatively small. The force exerted on the face 222 pushes the reciprocating member 40 generally in the downstream direction of water flow, the same direction that the PR spring 210 biases the reciprocating member 40.

The exit portion 154 of the reciprocating member 40 provides the other surface for the force differential. With reference to FIG. 4, the reciprocating member interior surface 156 includes a generally cylindrical section 230 beginning at the inlet 220 and extending towards the exit portion 154. The interior surface 156 further includes a discharge portion 232 wherein the surface 156 flares conically outward. As can be seen in FIGS. 3 and 4, the discharge portion 232 has a greater diameter than that of the inlet 220 such that a surface area of the discharge 232 is greater than the area of the face 222. As an example, the surface area of the discharge 232 may be 0.06 square inches while the area of the face 22 may be 0.033, or, alternatively, the magnitude of these surface areas may be in a ratio of approximately 1.8. Accordingly, there is a force differential applied to the reciprocating member 40 under constant pressure. As was stated above, the reciprocating member terminal wall 192 is exposed to the fluid flow. Accordingly, pressure from the water exerts a force upon the terminal wall 192 as well. It should be noted that the reciprocating member 40 only shifts when the force differential is sufficient to overcome the bias provided by the PR spring 210, and the amount the reciprocating member 40 shifts is dependent on the amount of force differential so that a greater force differential shifts the reciprocating member 40 a greater distance than a lesser force. That is, when the downstream pressure exceeds a predetermined amount, it causes a sufficient pressure differential to cause the reciprocating member 40 to shift toward the cage 44 to reduce the flow through the pressure regulator 20.

As can be seen in FIGS. 3 and 4, a cavity 240 is provided between the reciprocating member 40 and pipe interior surface 32. More specifically, the cavity 240 is defined by the seal 68 between the inlet cage 44 and pipe 10, the seal 116 between the housing body 48 and the pipe 10, the seal 170 between the inlet cage 44 and the reciprocating member 40, and the seal 190 between the reciprocating member 40 and the housing body 48. Each portion of the cavity 240 is in fluid communication with the rest of the cavity 240 such that the entire volume, as defined above, is at a generally equal pressure.

As the reciprocating member 40 shifts position, the volume of the cavity 240 is altered. To ensure operation of the reciprocating member 40, and the pressure regulator 20 itself, the cavity 240 is open to the environment of the pipe 10 and is held at a generally constant pressure, often referred to as a reference pressure. That is, the cavity 240 is in communication with the pipe vent ports 80 for receiving the barbs 72 of the housing body 48. The vent ports 80 are larger than the barbs 72, such that they vent to the environment outside of the pipe 10. The pipe 10 is generally buried underground as part of the irrigation network or located in a control box. Accordingly, the pressure within the cavity is equivalent to the gas pressure at the depth of the soil in which it or the control box is buried. In any event, this reference pressure is not sufficiently different from atmospheric pressure as to present a significant impact on the operation of the pressure regulator 20.

As the cavity 240 is open to the environment, gas is able to enter and exit the cavity 240 through the vent ports 80 as required by movement of the reciprocating member 40 in the cavity 240. More specifically, gas in the cavity 240 is permitted to escape the cavity 240 when the reciprocating member 40 shifts away from the fully open position to limit flow through the pressure regulator. When the reciprocating member 40 shifts towards the fully open position, the vent ports 80 also allow gas to be drawn into the cavity 240, so that the pressure remains generally constant within the cavity 240.

Each vent port 80 is surrounded by a short annular wall 242, and a filter 244 may be inserted in each port 80 within the wall 242 to prevent ingress of dirt or other foreign particulate matter. The filter 244 is preferably a porous foam polypropylene material. When the reciprocating member draws gas into the cavity 240 through the port 80, it is desirable for particulate matter to be prevented or restricted from also being drawn into the cavity 240. Prior art pressure regulators utilize vents that are located within sprinkler housings and behind seals to minimize the ingress of undesirable foreign particulate matter. Such seals are typically over-restrictive in permitting gas to pass through, under-restrictive in preventing the ingress of dirt, or both. By avoiding such a seal and by providing the static, non-moving or shape-changing filter 244, the present pipe 10 and pressure regulator 20 avoid these shortcomings.

In addition, many prior art pressure regulators are located in a housing that shifts to a position so that its vent can communicate with the atmosphere. The present pressure regulator 20 and pipe 10 remain stationary and need not shift during operation so that the port 80 may communicate with the atmosphere. Moreover, the present pressure regulator 20 and pipe 10 do not require complex molding and geometry to route a vent passage, as some prior art systems employ. In fact, existing pipes can be retrofitted with a device of the present design simply by boring out an interior surface to form the shoulder 60 and by providing the vent ports 80 in sides of the pipe.

The cooperation of the barbs 72 and vent ports 80 distribute the force exerted on the pressure regulator 20 by a general water flow into the pipe 10 in a direction parallel to the central axis X and, thus, along the pipe 10 itself. In this manner, this force does not tend to apply force to expand the pipe 10 in a localized region, nor is there a stress concentration created in a region in which fluid flows.

As can be seen, the pressure regulator 20 may be assembled sequentially within the pipe 10. The inlet cage 44 may be inserted with its seal 68 so that the inlet cage shoulder 64 is seated on the pipe shoulder 64. The seal 170 and the housing ring 46 are then inserted so that the housing ring shoulder 94 is against the inlet cage 44. The reciprocating member 40, with the seal 190 installed thereon, and the PR spring 210 are then inserted so that the body portion 152 is within the aperture 160 of the inlet cage 44 and the PR spring 210 is positioned between the reciprocating member 40 and the housing ring 46. The housing body 48 is then inserted so that the barbs 72 are received in the vent ports 80. At any point, the filters 244 may be installed in the vent ports 80.

With reference to FIGS. 12-26, an alternative form of a pipe 300 having a pressure regulator 302 is depicted. As many of the features of the alternative pressure regulator 302 are similar or identical in operation to those of the first described pressure regulator 10, not all are addressed herein. As can be seen in FIGS. 12 and 13, the pipe 300 includes an inlet section 304 and an outlet section 306 respectively providing an inlet 308 and an outlet 310 along a central axis A. A side section 312 is provided between the inlet 308 and outlet 310 for a filter 313 such as the above-described filter 13.

By way of comparison, the pipe 10 is typically smaller than the pipe 300. More specifically, the pipe 20 is preferably approximately ¾ inches in inner diameter such that it delivers water ranging from 0.1 to 5 gallons per minute (GPM) at a pressure ranging from 30-40 PSI. By way of example, a bubbler emitter utilized in a drip irrigation network delivers between 0.0083 to 0.25 GPM.

For larger networks which may include several hundred emitters, a larger pipe is desired or necessary. Accordingly, it is preferred that the pipe 300 has an inner diameter of approximately 1 inch. The pipe 300 then is able to deliver approximately 2 to 15 GPM in the desired pressure range. As will be described below, a flow passageway 460 through a reciprocating member 322 (FIG. 14) of the pressure regulator 302 is sized to provide the desired flow volume and pressure.

The reciprocating member 322 is shiftably received within an inlet cage 324 and within a housing ring 326, similar to those described above and depicted in FIGS. 13-15. The inlet cage 324, shown in detail in FIGS. 18-20, includes a distribution plate 330 connected to a body ring 332 by ribs 334 to define inlets 336. The reciprocating member 322 shifts relative to the distribution plate 330 to control the amount of fluid through the inlets 336 (FIGS. 14 and 15).

With reference to FIGS. 13 and 14, the inlet cage 324 may be inserted into the pipe 300 so that a shoulder 340 formed thereon contacts a shoulder 342 formed on an interior surface 344 of the pipe 300. A seal 346 is received in an annular groove 348 in an exterior surface 350 of the inlet cage 324 so that the seal 346 minimizes pressure and fluid bleed between the inlet cage 324 and the pipe interior surface 344.

The inlet cage 324 has an interior surface 352. A first annular portion 354 of the interior surface 352 defines an aperture 356 within which a cylindrical portion 358 of the reciprocating member 322 is closely received, while permitting relative shifting therebetween. A second annular portion 360 is provided such that a step or shoulder 362 is formed between the first and second portions 354 and 360 (FIG. 19). A seal 364 is positioned against the shoulder 362 and against an exterior surface 366 of the cylindrical portion 358 to minimize or prevent pressure and fluid bleed between the cylindrical portion 358 and the inlet cage 324.

The housing ring 326 is inserted into the pipe 300 to restrict the movement of the seal 364. The housing ring 326 has a first annular section 370 received within the inlet cage second annular section 360 such that a leading surface 372 on the housing ring 326 contacts the seal 364.

The housing ring 326 further provides securements in the form of barbs 380 for generally fixing the position of the housing ring 326 and the inlet cage 324. Once the inlet cage 324 has been inserted against the pipe shoulder 342, the seal 364 may be inserted. The housing ring 326 is then inserted into the pipe 300 until a shoulder 374, formed between the first annular section 370 and a second annular section 376 of the housing ring 326, contacts a surface 378 formed on the inlet cage second annular section 360 (see FIG. 19). At this depth of insertion, the barbs 380 are received in vent ports 382 formed in the pipe 300 to lock the inlet cage 324 and the housing ring 326 against unintentional movement.

Similar to the pipe 10, discussed above, the vent ports 382 provide a pressure sink and permit passage of gas between the inside of the pipe 300 and the environment outside of the pipe 300. Additionally, the vent ports 382 include a filter material 384 (FIG. 14) located therein to prevent ingress of dirt or other foreign particulate matter. It should be noted that the vent ports 80 of the pipe 10, discussed above, are oriented 90° different than the vent ports 382 of the pipe 300. However, the vent ports 80 and the vent ports 382 may be oriented in any direction of the 360° of its pipe, and the number may vary as well.

The housing ring 326 deflects inwardly during installation to accommodate the barbs 380. Referring to FIG. 13, the housing ring 326 includes cut-outs 385 so that deflectable portions 386 of the housing ring 326 may resiliently deform inwardly. In this manner, the barbs 380 are deflected inwardly so that they may fit within the outlet section 306 during insertion. Once the housing ring 326 is fully seated at the inlet cage 324 in the pipe 300, the barbs 380 shift outwardly so that they are received in and interlock with the vent ports 382 (FIGS. 14 and 15). Thus, the housing ring 326 is generally secured within the pipe 300, and the housing ring 326 and inlet cage 324 serve to generally fix each other within the pipe 300.

It should be noted that the housing ring 326 does not generally extend beyond the vent ports 382 in the downstream direction. Accordingly, an exit portion 390 (FIG. 21) of the reciprocating member 322 is sealed with the pipe interior surface 344 (see FIG. 14). The exit portion 390 includes an annular ring 392 extending outwardly from the reciprocating member 322. The ring 392 has a downstream face 394, and an annular seal 396 is positioned around the exit portion 390 for sealing the reciprocating member 322 with the pipe 300. The seal 396 has a base portion 398 closely received around the exit portion 390 for sealing thereagainst. The seal 396 also has an outwardly flaring conical lip 400 extending from the base 390 and against the pipe interior surface 344.

The exit portion 390 further receives a seal retainer 410 for securing the seal 396 to the reciprocating member 322. As can be seen in FIGS. 21 and 22, the exit portion 390 includes an annular rib 412 near a terminal end 414 of the reciprocating member 322. The exit portion 390 further includes an annular groove 416 located adjacent and partially defined by the rib 412. The seal retainer 410 cooperates with the rib 412 and the groove 416 to secure the seal 396. More specifically and with reference to FIG. 13, the seal retainer 410 is generally cylindrical with a central aperture 420 defined by an interior surface 422. The interior surface 422 has a rib 424 and a groove 426 so that the reciprocating member rib 412 is received by the seal retainer groove 426, while the seal retainer rib 424 is received by the reciprocating member groove 416. In this manner, the seal retainer 410 is snap-fit onto the reciprocating member exit portion 390.

Referring now to FIG. 15, the reciprocating member 322 is biased towards the outlet 310 by a PR spring 430. A first end 431 of the PR spring 430 is positioned against a shoulder 432 on an interior surface 434 of the housing ring 326 by the annular sections 370 and 376. A second end 438 of the PR spring 430 is positioned against a second, upstream directed side 440 on the exit portion ring 392.

To limit the downstream movement of the reciprocating member 322, a PR retainer 450 (FIGS. 23-25) and the retainer ring 452 (FIG. 26) are installed within the pipe 300, best viewed together in FIG. 15. That is, after the inlet cage 324 and housing ring 326 are installed, the reciprocating member 322 and the PR spring 430 are inserted into the pipe 300. The PR retainer 450 and the retainer ring 452 are then inserted into the pipe 300 to prevent the reciprocating member 322 from exiting the pipe 300.

Toward this end, the PR retainer 450 has an inner ring 454 defining an exit passage 455 for fluid from the pressure regulator 302. The inner ring 454 has stops 456 extending therefrom in an axially upstream direction such that gaps 458 are positioned between the stops 456. Water flowing through the pressure regulator 302 flows through the inlet cage 324, through the passage 460 in the reciprocating member cylindrical and exit portions 358 and 390, respectively, and then through the passage 455 in the inner ring 454. Accordingly, the inner ring 454 is generally aligned with an end 457 of the exit portion 390 (FIG. 15).

The PR retainer 450 includes an outer ring 466 connected to the inner ring 454 by an end face 468. The outer ring 466 is snugly received within the pipe interior surface 344. Both rings 466 and 454, as well as the end face 468, are solid and generally impervious to water. Therefore, cavities 470 are defined by the PR retainer 450. The gaps 458 between the stops 456 permit fluid exiting the reciprocating member 322 to pass into the cavity 470 so that the pressure therewithin is equal to the pressure of the flow through the reciprocating member 322.

The PR retainer 450 is secured within the pipe 300 with the retainer ring 452. The retainer ring 452 (FIG. 26) has a central ring 480 positioned around a portion 459 of the inner ring 454 that extends beyond the end face 468. A plurality of barbs or teeth 482 radially extend from the central ring 480 so that the diameter of the retainer ring 452 is slightly larger than the interior diameter of the pipe 300. As the retainer ring 452 is installed, the teeth 482 deform slightly so they may be received within the pipe 300. Once seated, the teeth 482 bite into the pipe 300 when force is applied against the PR retainer 450 and the retainer ring 452 in the downstream direction, thereby securing the position of the PR retainer 450 and the retainer ring 452 within the pipe 300 (FIGS. 14 and 15)

Like the pressure regulator 20, the pressure regulator 302 utilizes the reciprocating member 322 to shift when a force differential exceeds a predetermined threshold to overcome the bias of the PR spring 430. As best viewed in FIG. 15, the seal retainer 410, discussed above, also has a downstream face 480 located at its downstream end. The downstream face 480 is exposed at least to the cavity 470 and, therefore, is exposed to the pressure through the pressure regulator 302. The pressure from the fluid flow through the reciprocating member 324 acts upon the downstream face 480 of the seal retainer 410 secured with the reciprocating member 324 and on the end 457 of the reciprocating member 324 itself. The pressure also acts upon an end surface 500 of the cylindrical portion of the reciprocating member 322 (FIG. 15). As the surface area of the reciprocating member end 457 and downstream face 480 is greater than the surface area of the end surface 500, the force is lower on the end surface 500. By way of example, the surface area of the end surface 500 may be 0.30 square inches while the combined surface areas of the reciprocating member end 457 and downstream face 480 is 0.75 square inches, or, alternatively, these may be in a ratio of 2.5. Should the pressure be greater than a predetermined amount to overcome the bias of the PR spring 430, the force differential will shift the reciprocating member 322 towards the inlet cage distribution plate 330 to restrict the flow through the inlets 336.

The pressure regulator 302 provides a greater flow passage 460 therethrough than the fluid passage 150 of the pressure regulator 20. As noted above, the pressure regulator 302 is preferably used in a 1 inch inner diameter pipe, while the pressure regulator 20 is designed for use in a ¾ inch inner diameter pipe. For the pressure regulator 20, the seal 190 is between the reciprocating member 40 and the housing body 48. In contrast, the pressure regulator 300 includes a reciprocating member 322 that seals, via seal 396 having the conical lip 400, with the interior surface 344 of the pipe 300. The seal lip 400 allows the reciprocating member 322 to shift easily within the pipe 300. Accordingly, the cross-sectional size of the flow passage 460 is relatively increased.

In the same manner as the pressure regulator 20, components of the pressure regulator 302 may be sequentially installed into the pipe outlet 306. The inlet cage 324 and its seal 346 may be inserted until the shoulders 340 and 342 are in contact. The seal 364 and the housing ring 326 may then be installed until the barbs 380 are received in the vent ports 382. The reciprocating member 322 is secured with the seal 396 and the seal retainer 410, whereupon the reciprocating member 322 and the PR spring 430 are inserted into the pipe 300. The PR retainer 450 and retainer ring 452 are then inserted to retain the reciprocating member 322 within the pipe 300.

While the invention has been described with respect to specific examples, including presently preferred modes of carrying out the invention, those skilled in the art will appreciate that there are numerous variations and permutations of the above described apparatuses and methods that fall within the spirit and scope of the invention as set forth in the appended claims.

What is claimed is:

1. An apparatus for use with an irrigation network, the apparatus comprising:
   a conduit wall defining an inlet section for receiving water, an outlet section for delivering water, and a vent opening extending through the conduit wall to vent gas pressure;
   a fluid filter assembly secured within the conduit wall such that fluid is received by the inlet section, flows through the fluid filter, and is delivered by the outlet section;
   a pressure regulator module releasably and coaxially secured within the outlet section of the conduit wall, the pressure regulator module for controlling pressure and rate of fluid flow, the pressure regulator module including:

a movable member operable to shift relative to the conduit wall to regulate the amount of fluid delivered by the outlet section;

a housing wall defining a cavity within which at least a portion of the movable member is received; the cavity in communication with the vent opening to vent gas pressure in the cavity;

a resilient portion of the housing wall defining an outwardly extending securing member, the resilient portion of the housing wall flexed inwardly by the conduit wall when the pressure regulator module is partially received in the outlet section; and the outwardly extending securing member seated in the vent opening when the pressure regulator module is fully received in the outlet section to secure the pressure regulator module in the conduit wall.

2. The apparatus of claim 1 wherein the pressure regulator module is snapped within the outlet section.

3. The apparatus of claim 1 wherein the conduit wall further has a side pipe section inclined relative to the conduit inlet and outlet sections, and the fluid filter assembly is secured to the side pipe section, and wherein the fluid is bypassed through the side pipe section from the inlet section to the outlet section.

4. The apparatus of claim 3 wherein the inlet section and outlet section are generally cylindrical and co-axial, and the side pipe section extends transverse to the inlet and outlet sections.

5. The apparatus of claim 4 wherein the side pipe section includes a cap that is removable to easily replace the fluid filter assembly.

6. The apparatus of claim 1, further comprising a gas filter located within the vent opening to prevent ingress of particulate matter and the vent opening permitting gas to pass through the gas filter to vent pressure acting on the movable member.

7. The apparatus of claim 6 wherein the apparatus is capable of being associated with a ground environment.

8. The apparatus of claim 6 wherein the conduit wall generally remains stationary during operation.

9. The apparatus of claim 1, wherein the pressure regulator module housing wall defines a cutout arranged and configured to permit the resilient portion to flex inwardly to the cavity when the pressure regulator module is received in the conduit outlet section.

10. The apparatus of claim 1, wherein the vent opening is larger than the outwardly extending securing member so that the vent opening can vent gas pressure in the cavity and receive the outwardly extending securing member simultaneously.

11. The apparatus of claim 1, wherein the vent opening has a size sufficient to permit deflection of the outwardly extending securing member inwardly to the cavity to permit removal the pressure regulating module from the conduit wall.

* * * * *